US011308063B2

(12) United States Patent
Sahi et al.

(10) Patent No.: US 11,308,063 B2
(45) Date of Patent: Apr. 19, 2022

(54) DATA STRUCTURE TO ARRAY CONVERSION

(71) Applicant: Oath Inc., New York, NY (US)

(72) Inventors: Attila Arpad Sahi, San Jose, CA (US); An Jiang, Sunnyvale, CA (US); Raj Amrit, Sunnyvale, CA (US); Dipankar Biswas, Newark, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 88 days.

(21) Appl. No.: 16/730,910

(22) Filed: Dec. 30, 2019

(65) Prior Publication Data

US 2021/0200734 A1   Jul. 1, 2021

(51) Int. Cl.
*G06F 16/00* (2019.01)
*G06F 16/22* (2019.01)
*G06N 20/00* (2019.01)
*G06F 16/25* (2019.01)

(52) U.S. Cl.
CPC ...... *G06F 16/2272* (2019.01); *G06F 16/2237* (2019.01); *G06F 16/2246* (2019.01); *G06F 16/258* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 9,953,058 B1* | 4/2018 | Sadri | G06F 16/2246 |
| 2010/0042598 A1* | 2/2010 | Shinjo | G06F 16/90344 |
| | | | 707/640 |
| 2011/0016153 A1* | 1/2011 | Atta | G06F 16/282 |
| | | | 707/797 |
| 2019/0080015 A1* | 3/2019 | Noor | G06F 16/955 |

* cited by examiner

*Primary Examiner* — Bai D Vu
(74) *Attorney, Agent, or Firm* — Cooper Legal Group, LLC

(57) ABSTRACT

One or more computing devices, systems, and/or methods for converting a data structure into an array are provided herein. Nodes of a data structure, such as a tree structure, are recursively processed to convert the data structure into an array. When processing a numerical node that is a parent of a low child node and a high child node, the numerical node of the tree structure is inserted into a first array element. The low child node is inserted into a second array element next to the first array element. The high child node is inserted into a third array element next to the second array element. A reference to the high child node is stored in association with the numerical node.

20 Claims, 8 Drawing Sheets

DATA STRUCTURE TO ARRAY CONVERSION

BACKGROUND

Various types of data structures can be used to store a variety of different information. In an example, a tree structure may be utilized as a data structure to store a decision tree of a model. The model may be a predictive model used to output predictions, such as a predicted likelihood of certain future user behavior (e.g., a likelihood that a user will interact with content provided to the user through a website). In an example, the predictive model may correspond to a random forest model or other type of model that may be comprised of a collection of decision trees stored according to the tree structure. For example, the random forest model may store data within nodes of the tree structure. A decision tree of the random forest model may have a binary tree structure where nodes are either intermediate numerical nodes or are final leaf nodes. The nodes and data stored therein may be utilized by machine learning functionality to generate and output the predictions.

Even though the tree structure, such as that used by the random forest model to store a decision tree, may be simplistic, the tree structure has high memory consumption. If a significant number of models are being evaluated to generate predictions for a large number of users, performance degradation will occur, thus causing scalability issues. For example, online and/or offline scoring of hundreds or thousands of models using random forest trees may entail loading a large amount of data into memory. This large amount of data may correspond to hundreds of decision trees per model and hundreds of thousands of nodes per decision tree. In this way, performance degradation, inefficient usage of memory, and scalability issues will result.

SUMMARY

In accordance with the present disclosure, one or more computing devices and/or methods for converting a data structure into an array are provided. In an embodiment, nodes of a data structure, such as a tree structure corresponding to a model (e.g., a decision tree of a predictive model, such as a random forest model, utilized by machine learning functionality to generate predictions), are recursively processed to convert the data structure such as the tree structure into an array. In an embodiment, the tree structure may comprise a binary tree of numerical nodes (e.g., intermediary nodes) and final leaf nodes (e.g., leaf nodes). A numerical node may be a parent node connected to one or more child nodes, such as a low child node (e.g., a node connected to the left of the numerical node) and a high child node (e.g., a node connected to the right of the numerical node). If the tree structure corresponds to a decision tree of a model being evaluated, then the numerical nodes may control the evaluation process with a feature index object, a split value object, the low child node, and the high child node of the numerical node. The feature index object is used by the evaluation process to read a corresponding value from a user profile map. The split value is used by the evaluation process to compare the split value with the value stored in the user profile for a specific feature. The low child node is the next node to evaluate by the evaluation process if the value from the user profile is less than the split value in a numerical node that is the parent of the low child node and the high child node. The high child node is the next node to evaluate by the evaluation process if the value from the user profile is greater than or equal to the split value in a numerical node that is the parent of the low child node and the high child node. In this way, the comparison of a split value within a numerical node to a value within a user profile determines whether the evaluation process will next evaluate (traverse) the low child node or the high child node. A leaf node is an exit point of the evaluation process that has a probability value as an output (e.g., a double precision floating point number as a return value of a probability of something such as a likelihood of certain future user behavior).

During the evaluation of tree structures of models, data of the tree structures is loaded into memory. When a substantial number of models are being evaluating, then a large amount of memory may be consumed (e.g., an evaluation procedure may evaluate a thousand models that each have hundreds of tree structures comprising hundreds of thousands of nodes per tree structure), which can result in performance degradation. Accordingly, a recursive process is performed to recursively process nodes of a tree structure to convert the tree structure into an array. The array consumes a significantly less amount of memory than the tree structure (e.g., a 90% memory footprint reduction). This significant reduction in memory usage reduces performance degradation and scaling issues that otherwise would occur when evaluating numerous models by loading tree structures into memory. Efficiently utilizing memory will improve the operation of computing devices executing the models, and will also allow the computing devices to evaluate more models simultaneously for improved/more precise output.

In an embodiment of the recursive process, a numerical node is identified as a parent of a low child node and a high child node. The low child node may be a numerical node or a leaf node. The high child node may be a numerical node or a leaf node. If the low child node is a leaf low child node and the high child node is a numerical high child node, then the numerical node is inserted into a first array element. The leaf low child node is inserted into a second array element next to (adjacent) the first array element. A high child reference index is set to a value that is two greater than an index of the first numerical node (e.g., a value corresponding to an index of a third array element next to (adjacent) the second array element). The numerical high child node is inserted into the third array element.

If the low child node is a leaf low child node and the high child node is a leaf high child node, then the numerical node is inserted into a first array element. The leaf low child node is inserted into a second array element next to (adjacent) the first array element. A high child reference index is set to a value that is two greater than an index of the first numerical node (e.g., a value corresponding to an index of a third array element next to (adjacent) the second array element). The leaf high child node is inserted into the third array element.

If the low child node is a numerical low child node and the high child node is a numerical high child node, then the numerical node is inserted into a first array element. The numerical low child node is inserted into a second array element next to (adjacent) the first array element. A populated size of the array (e.g., a size of the array that has been populated with data, such as a number of populated array elements) is determined. A high child reference index is set to a value corresponding to an end of the array (e.g., a last/final array element that is populated) that is identified using the populated size of the array. The numerical high child node is recursively processed as a next numerical node to process by the recursive process.

If the low child node is a numerical low child node and the high child node is a leaf high child node, then the numerical node is inserted into a first array element. The numerical low child node is inserted into a second array element next to (adjacent) the first array element. A populated size of the array (e.g., a size of the array that has been populated with data, such as a number of populated array elements) is determined. A high child reference index is set to a value corresponding to an end of the array (e.g., a last/final array element that is populated) that is identified using the populated size of the array. The leaf high child node is processed.

In this way, nodes of the tree structure are processed to convert the tree structure into an array that has a substantially smaller memory footprint than the tree structure. For example, the tree structure may comprise a 64 bit reference to the low child node. However, the reference to the low child node may be excluded within the array because the low child node is stored in the next array element. The high child reference index may be an index value in short integer format that is 16 bits, as opposed to the 64 bit reference within the tree structure to the high child node.

In an embodiment where the array is a node array, additional memory space savings can be achieved by serializing the node array. Serializing the node array into a serialized/byte array can reduce or eliminate header and padding overhead that is otherwise associated with individual node objects. The byte array may comprise a type identifier byte indicating whether a node has a numerical node type or a leaf node type. The byte array comprises serialized internal data specifying split values of nodes. The byte array comprises serialized internal data specifying a feature index. The byte array comprises serialized internal data specifying an offset reference to a high child node having a numerical node type. The byte array comprises serialized internal data specifying one double value for a high child node having a leaf node type.

In an embodiment, the array (e.g., the node array or the serialized/byte array) may be compressed for additional memory space savings. For example, a lookup table may be generated to comprise values that occur within models greater than a frequency threshold. In this way, the lookup table is used to compress the array by replacing values occurring in both the array and the lookup table with corresponding replacement values mapped to the values within the lookup table. Because the replacement values are shorter/smaller than the values being replaced, the size of the array can be reduced.

In an embodiment, a group of nodes within the array may be clustered into a single block representation of the group of nodes in order to provide additional memory space savings. For example, one or more nodes of the model (e.g., nodes within the array) are clustered into a group of nodes for storage within the array as a single block representing the one or more nodes. Bit level storage may be utilized to represent node types and compression flags (e.g., a bit may be used to represent a node type as either a numerical node type or a leaf node type, another bit may be used to flag a node as either being compressed or uncompressed, etc.). Because the single block representation consumes less memory than individually storing each node within the group of nodes, memory consumption is improved.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
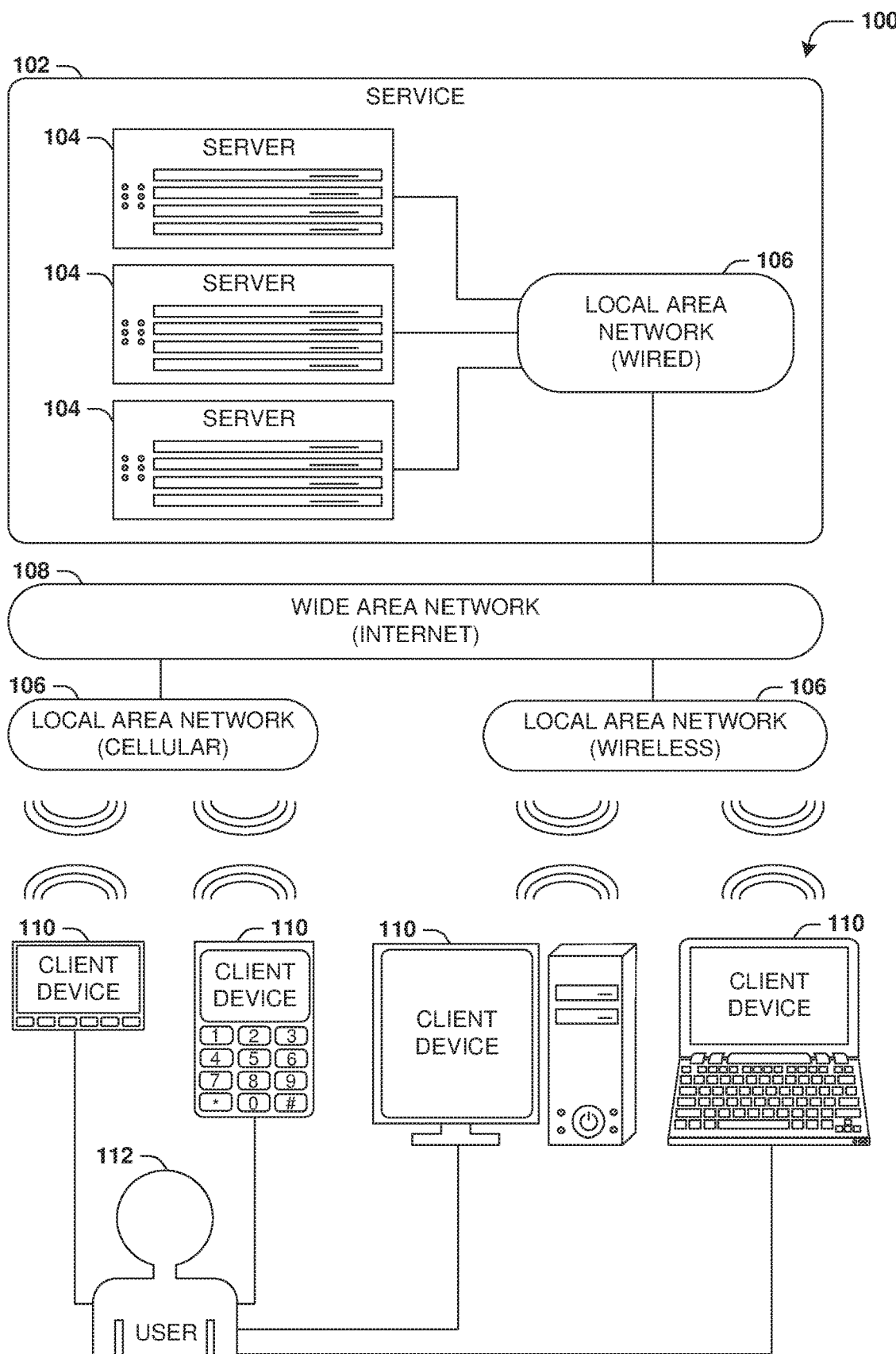
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
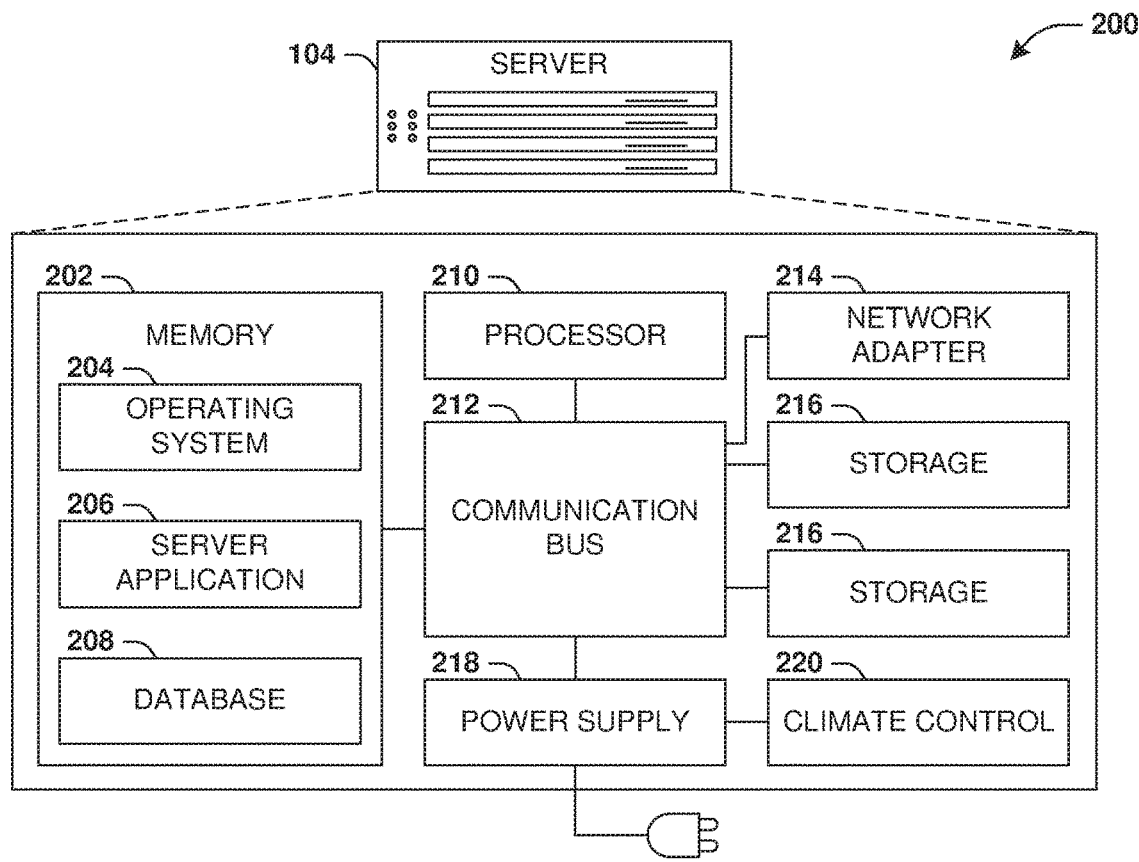
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
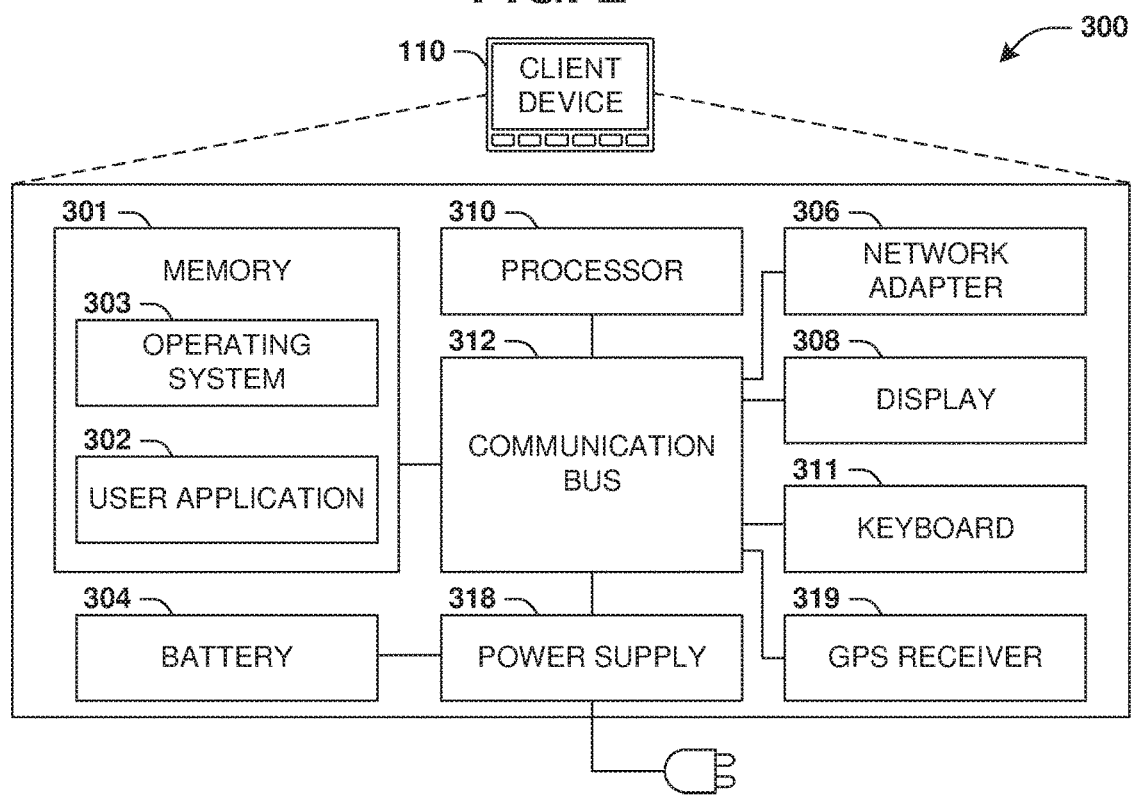
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

Techniques are provided for converting a data structure into an array. A model may be utilized by machine learning functionality to perform various functions. The model may be used as a predictive model to output a prediction, such as a likelihood of certain future user behavior (e.g., a likelihood that a user would want to stop at a coffee shop on the way to work, a likelihood that a user will interact with a recommendation to purchase a product, etc.). In an embodiment, the model may utilize decision trees that are stored within data structures such as tree structures with nodes that are evaluated during execution of the model by an evaluation process to output a prediction. The model may comprise hundreds of tree structures. Each tree structure can comprise hundreds of thousands of nodes. When numerous models are being evaluated for a large number of users (e.g., thousands of users of a website for which models are being used to select content items to show the users through the website), a substantial amount of data must be stored within memory. Unfortunately, this can cause performance degradation and limits the number of models that can be concurrently utilized, thus reducing the accuracy of overall predictions made using the models (e.g., content items that may be uninteresting to users may end up being selected and displayed through the website due to the imprecision of the predictions, thus wasting network and computing resources). In this way, memory and computing resources are not efficiently utilized because so much data must be stored into memory due to the structure of how the tree structures store data.

In an example, the tree structure may correspond to a decision tree of a random forest model. The decision tree may be a binary tree of numerical nodes (e.g., intermediary nodes within the tree structure) and final leaf nodes (e.g., leaf nodes within the tree structure). A numerical node may be a parent node connected to one or more child nodes, such as a low child node (e.g., a left node) and a high child node (e.g., a right node). The numerical nodes may control the evaluation process of the random forest model for outputting a prediction by utilizing a feature index object, a split value object, the low child node, and the high child node of a numerical node. The feature index object is used by the evaluation process to read a corresponding value from a user profile map (e.g., the value may correspond to a feature of a user represented by the user profile map). The split value of a numerical node is used by the evaluation process to compare the split value with the value stored in the user profile for a specific feature. The low child node is the next node to evaluate by the evaluation process if the value from the user profile is less than the split value in the numerical node that is the parent of the low child node and the high child node. The high child node is the next node to evaluate by the evaluation process if the value from the user profile is greater than or equal to the split value in the numerical node that is the parent of the low child node and the high child node. Another type of node within the tree structure is a leaf node that is an exit point of the evaluation process. The leaf node comprises a probability value as an output (e.g., a double precision floating point number as a return value of a probability of something such as a likelihood of certain future user behavior corresponding to a likelihood that a user will interact with content provided to the user through the website).

The tree structure can have a relatively large memory footprint when all of the nodes, header data, and padding data are loaded into memory. For example, when object data of a single object is to be loaded into memory, header data corresponding to an internal structure for memory management and garbage collection (e.g., a virtual machine (JVM) internal structure) is also loaded into memory. Further, padding for the object data (e.g., padding because a virtual machine (JVM) allocated memory in relatively smaller blocks) must also be loaded into memory. Additionally, each numerical node has a pointer/reference (e.g., a 64 bit pointer) to a low child node and a pointer/reference (e.g., a 64 bit pointer) to a high child node, which are also loaded into memory. Loading all of this data into memory for merely a single node is not memory efficient.

Accordingly, as provided herein, nodes of a tree structure within a model may be recursively processed to convert the tree structure into a memory efficient array (e.g., an object array that may be further serialized into a byte array for additional memory efficiency). In particular, a recursive process is performed to recursively process the nodes within the tree structure in order to populate certain data, but exclude other data for memory storage savings (e.g., exclude pointers to low child nodes because a low child node is always stored in a next array element adjacent an array element storing a numerical node that is a parent of the low child node; header data; and/or padding data), into array elements of the array. Depending on whether a low child node is a numerical node or a leaf node of a parent numerical node under evaluation and whether a high child node is a numerical node or a leaf node of the parent numerical node, the parent numerical node may be stored within a first array element. The low child node may be stored within a second array element next to (adjacent) the first array element. The high child node may be stored within a third array element next to (adjacent) the second array element. Merely a reference to the high child node, but no reference to the low child node, may be stored in order to conserve memory utilization by the array. For example, the tree structure may comprise a 64 bit reference to the low child node. However, the reference to the low child node may be excluded within the array because the low child node is stored in the second array element that is next to the first array element within which the parent numerical node is stored. The reference to the high child node may be stored as a high child reference index that may be an index value in short integer format that is 16 bits, as opposed to a 64 bit reference within the tree structure to the high child node.

The array consumes a significantly less amount of memory than the tree structure (e.g., a 90% memory footprint reduction). In this way, nodes of the tree structure are processed to convert the tree structure into an array that has a substantially smaller memory footprint than the tree structure. This significant reduction in memory usage reduces performance degradation and scaling issues that otherwise would occur when evaluating numerous models represented as tree structures. Efficiently utilizing memory will improve the operation of computing devices executing the models, and will also allow the computing devices to evaluate more models simultaneously.

Additional processing, such as serialization, compression, and clustering of nodes into single composite nodes, may be performed for additional memory storage savings. In an embodiment of serialization, additional memory space savings can be achieved by serializing the array from being a node array into being a serialized/byte array. Serializing the node array into a serialized/byte array can reduce or eliminate header and padding overhead that is otherwise associated with individual node objects. The byte array may comprise a type identifier byte indicating whether a node has a numerical node type or a leaf node type. The byte array comprises serialized internal data specifying split values of nodes. The byte array comprises serialized internal data specifying a feature index. The byte array comprises serialized internal data specifying an offset reference to a high child node having a numerical node type. The byte array comprises serialized internal data specifying one double value for a high child node having a leaf node type.

In an embodiment of compression, the array (e.g., the node array or the serialized/byte array) may be compressed for additional memory space savings. For example, a lookup table may be generated to comprise values that occur within models greater than a frequency threshold. In this way, the lookup table is used to compress the array by replacing values occurring in both the array and the lookup table with corresponding replacement values mapped to the values within the lookup table. Because the replacement values are shorter/smaller than the values being replaced, the size of the array can be reduced.

In an embodiment of clustering nodes into single composite nodes (e.g., a single block representation), a group of nodes within the array may be clustered into a single block representation of the group of nodes in order to provide additional memory space savings. For example, one or more nodes of the model (e.g., nodes within the array) are clustered into a cluster for storage within the array as a single block representing the one or more nodes. Bit level storage may be utilized to represent node types and compression flags (e.g., a bit may be used to represent a node type as either a leaf node type or a numerical node type, another bit may be used to flag a node as either being compressed or uncompressed, etc.).

Figure 4:
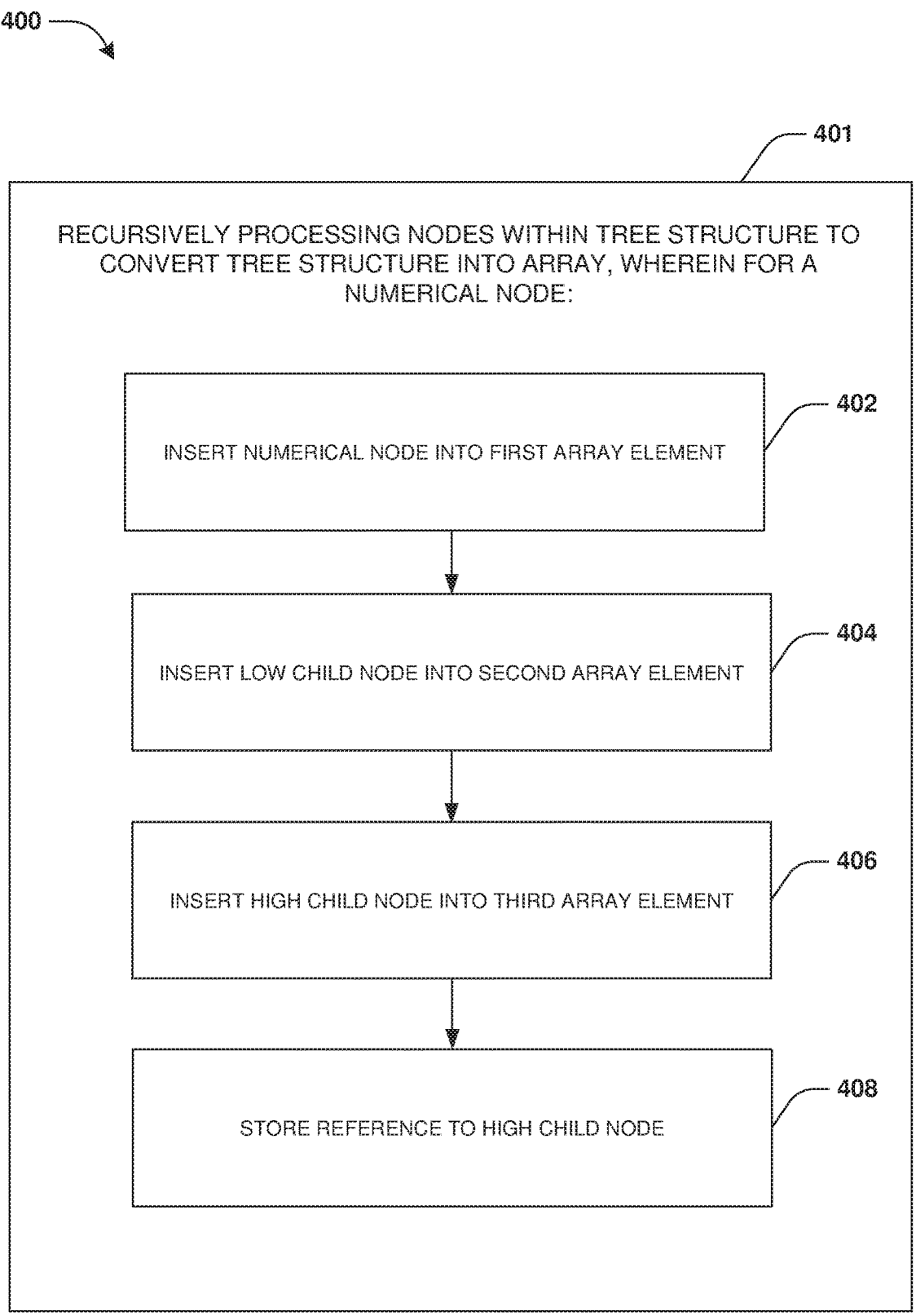
FIG. 4 is a flow chart illustrating an example method for converting a data structure into an array.

An embodiment of converting a data structure into an array is illustrated by an example method 400 of FIG. 4. A computing service may utilize models to perform various tasks, such as to select content to display to users that may be engaging and relevant to the users, and/or motivate the users to perform certain actions. The computing service may select content at any given point in time for thousands of users (e.g., users accessing a website, users accessing an email application, users interacting with a social network feed, etc.). In order to select content to provide to the users, the computing service may perform an evaluation of hundreds to thousands of models that implement machine learning functionality to output predictions such as a likelihood that a particular user will interact with certain content. Each model, such as a random forest model, may comprise hundreds of decision trees that are tree structures with nodes that are evaluated to output a prediction. Because a single tree structure can have hundreds of thousands of nodes, each model may have hundreds of tree structures, and thousands of models may be used to output predictions for thousands of users, a significant amount of data must be loaded into memory during the evaluations of the models.

Accordingly, in order to reduce memory utilization during the evaluation of the models, nodes within a tree structure are recursively processed to convert the tree structure into an array, at 401. In an embodiment, the tree structure comprises a binary tree with a root node, numerical nodes, and leaf nodes. A numerical node may be a parent node connected to one or more child nodes, such as a low child node (e.g., a node connected to the left of the parent node) and a high child node (e.g., a node connected to the right of the parent node). The numerical nodes may control the evaluation process with a feature index object, a split value object, a low child node of a numerical node, and a high child node of a numerical node. The feature index object is used by the evaluation process to read a corresponding value from a user profile map. A split value of a numerical node is used by the evaluation process to compare the split value with the value stored in the user profile for a specific feature. The low child node is the next node to evaluate by the evaluation process if the value from the user profile is less than the split value in the numerical node that is the parent of the low child node and the high child node. The high child node is the next node to evaluate by the evaluation process if the value from the user profile is greater than or equal to the split value in the numerical node that is the parent of the low child node and the high child node. A leaf node is an exit point of the evaluation process that has a probability value as an output (e.g., a double precision floating point number as a return value of a probability of something such as a likelihood of certain future user behavior corresponding to a likelihood that a user will interact with a content item).

Each node of the tree structure may be evaluated and processed by the recursive process in order to populate array elements of the array with certain data from the tree structure. For a given numerical node within the tree structure, the recursive process inserts the numerical node into a first array element, at 402. The numerical node may be parent of a low child node (e.g., a left node) and a high child node (e.g., a right node). At 404, the low child node is inserted into a second array element directly next to (adjacent) the first array element. Because the low child node is inserted into the second array element that is directly next to the first array element, a low child reference within the tree structure to the low child node is not stored into the array, which saves memory space because the low child reference may consume 64 bits or any other amount of data.

At 406, the high child node is inserted into a third array element, dependent on various factors. In an embodiment, the third array element is next to (adjacent) the second array element. At 408, a reference to the high child node is stored, such as within the array. The reference may comprise a high child reference index that points from the parent numerical node to the high child node in the third array element. The high child reference index may be an index value in short integer format that is 16 bits, as opposed to a high child reference within the tree structure that may consume 64 bits or any other amount of data. Thus, storing the high child reference index in the short integer format also saves memory storage consumption when loading the array into memory as opposed to loading the tree structure into memory.

The processing and storing of data relating to the numerical node, the low child node, and the high child node may differ based upon whether the low child node is a numerical low child node or a leaf low child node and/or whether the high child node is a numerical high child node or a leaf low child node. In an embodiment of the recursive process, a numerical node is identified as a parent of a low child node and a high child node. The low child node may be a numerical node or a leaf node. The high child node may be a numerical node or a leaf node. If the low child node is a leaf low child node and the high child node is a numerical high child node, then the numerical node is inserted into the first array element. The leaf low child node is inserted into the second array element that is directly next to the first array element. A high child reference index is set to a value that is two greater than an index of the first numerical node (e.g., a value corresponding to an index of a third array element that is next to the second array element). The numerical high child node is inserted into the third array element.

If the low child node is a leaf low child node and the high child node is a leaf high child node, then the numerical node is inserted into the first array element. The leaf low child node is inserted into the second array element that is directly next to the first array element. A high child reference index is set to a value that is two greater than an index of the first numerical node (e.g., a value corresponding to an index of a third array element that is next to the second array element). The leaf high child node is inserted into the third array element.

If the low child node is a numerical low child node and the high child node is a numerical high child node, then the numerical node is inserted into the first array element. The numerical low child node is inserted into the second array element that is directly next to the first array element. A populated size of the array (e.g., a size of the array that has been populated with data, such as a number of populated array elements) is determined. A high child reference index is set to a value corresponding to an end of the array (e.g., a last/final array element that is populated) that is identified using the populated size of the array. The numerical high child node is recursively processed as a next numerical node to process by the recursive process.

If the low child node is a numerical low child node and the high child node is a leaf high child node, then the numerical node is inserted into the first array element. The numerical low child node is inserted into the second array element that is directly next to the first array element. A populated size of the array (e.g., a size of the array that has been populated with data, such as a number of populated array elements) is determined. A high child reference index is set to a value corresponding to an end of the array (e.g., a last/final array element that is populated) that is identified using the populated size of the array. The leaf high child node is processed.

In this way, each node within the tree structure is processed so that certain data, but not all data, from the tree structure is inserted into the array that is significantly more memory efficient (e.g., up to 90% more efficient) when loaded into memory for execution of the model than the tree structure.

Additional processing may be performed to further improve memory consumption. In an embodiment of serialization for improved memory consumption where the array is a node array, additional memory space savings can be achieved by serializing the node array into a byte array. Serializing the node array into the byte array can reduce or eliminate header and padding overhead that is otherwise associated with individual node object. The byte array may comprise a type identifier byte indicating whether a node has a numerical node type of a leaf node type. The byte array comprises serialized internal data specifying split values of nodes. The byte array comprises serialized internal data specifying a feature index. The byte array comprises serialized internal data specifying an offset reference to a high child node having a numerical node type. The byte array comprises serialized internal data specifying one double value for a high child node having a leaf node type.

In an embodiment of compression for improved memory utilization, the array (e.g., the node array or the serialized/byte array) may be compressed for additional memory space savings. For example, a lookup table may be generated to comprise values that occur within models greater than a frequency threshold. In this way, the lookup table is used to compress the array by replacing values occurring in both the array and the lookup table with corresponding replacement values mapped to the values within the lookup table. Because the replacement values are shorter/smaller than the values being replaced, the size of the array can be reduced.

In an embodiment of compaction for improved memory utilization, a group of nodes within the array may be clustered into a single block representation (a composite node) for the group of nodes in order to provide additional memory space savings. For example, one or more nodes of the model (e.g., nodes within the array) are clustered into a cluster for storage within the array as a single block representing the one or more nodes. Bit level storage may be utilized to represent node types and compression flags (e.g., a bit may be used to represent a node type as either leaf node type of a numerical node type, another bit may be used to flag a node are compressed or uncompressed, etc.).

Figure 5:
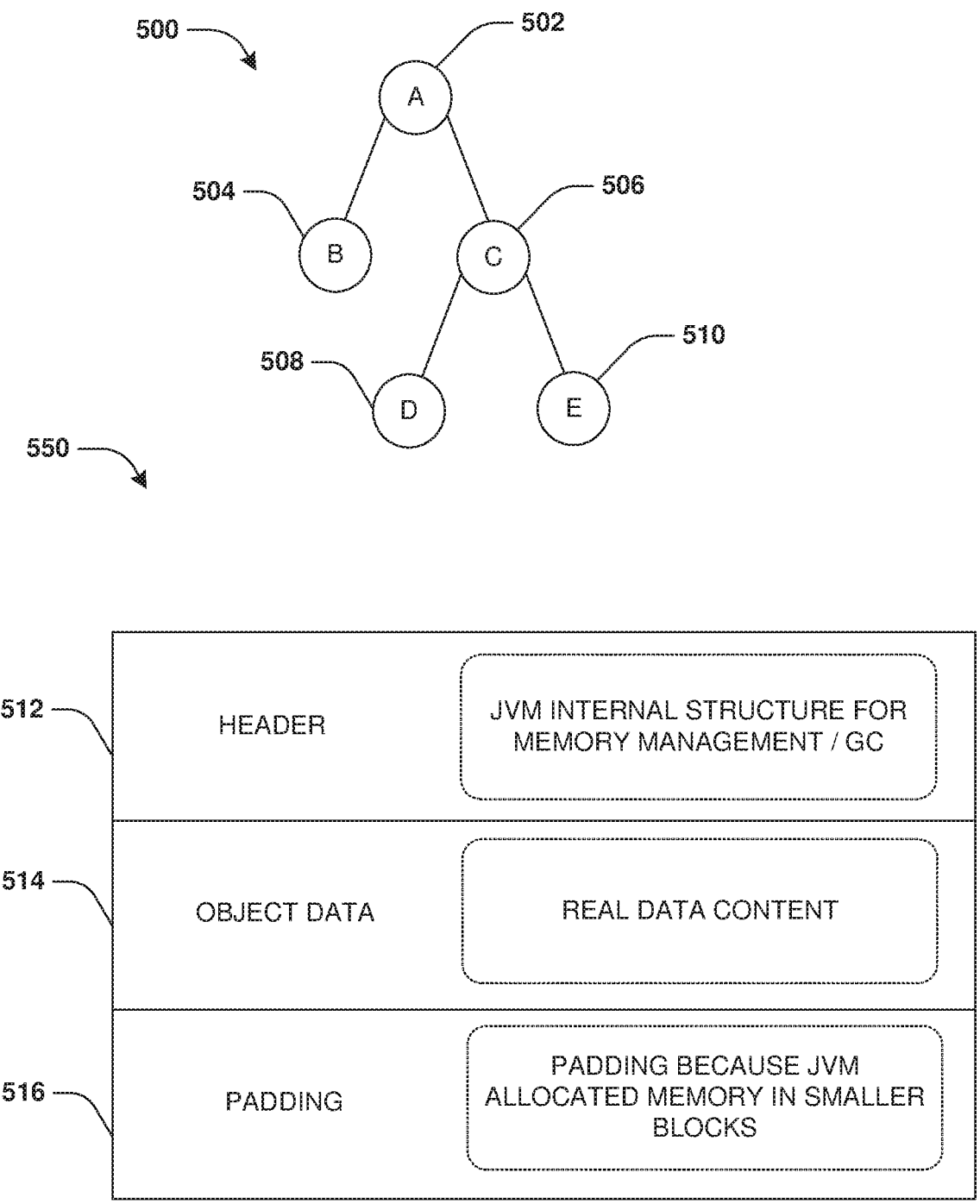
FIG. 5 is an illustration of a tree structure and node data of a node within the tree structure.

FIG. 5 illustrates a tree structure 500 that can be recursively processed using the techniques described herein to convert the tree structure 500 into an array that consumes less memory than the tree structure 500. The tree structure 500 may be associated with a model, such as where the tree structure 500 is a binary tree of a random forest model utilized by machine learning to output predictions. The tree structure 500 comprises one or more nodes, such as a node (A) 502 that is a root node, a node (B) 504 that is a leaf node, a node (C) 506 that is a numerical (intermediary) node, a node (D) 508 that is a leaf node, and a node (E) 510 that is a leaf node. It may be appreciated that the tree structure 500 is illustrated with merely a few nodes for simplicity, but that the tree structure 500 could comprise any number of nodes, such as hundreds of thousands of nodes.

In an embodiment, the node (A) 502 may be an intermediary node that is a parent of the node (B) 504 and the node (C) 506. The node (B) 504 may be a leaf low child node of the node (A) 502 (e.g., a leaf node that is a child of the node (A) 502 and is a low node such as a node connected to the left of the node (A) 502). The node (C) 506 may be a numerical high child node of the node (A) 502 (e.g., an intermediary node that is a child of the node (A) 502 and is a high node such as a node connected to the right of the node (A) 502).

The node (C) 506 may be a numerical node that is a parent of the node (D) 508 and the node (E) 510. The node (D) 508 may be a leaf low child node of the node (C) 506 (e.g., a leaf node that is a child of the node (C) 506 and is a low node such as a node connected to the left of the node (C) 506). The node (E) 510 may be a leaf high child node of the node (C) 506 (e.g., a leaf node that is a child of the node (C) 506 and is a high node such as a node connected to the right of the node (C) 506).

A structure 550 represents real data content and overhead data associated with a node of the tree structure 500. The structure 550 comprises a header 512, which consumes memory when the tree structure 500 is loaded into memory. In an embodiment, the header 512 corresponds to an internal structure (e.g., a virtual machine internal structure) for memory management and/or garbage collection. The structure 550 comprises object data 514 with is the actual/real data content of the node, which consumes memory when the tree structure 500 is loaded into memory. The structure 550 comprises padding 516, which consumes memory when the tree structure 500 is loaded into memory. In an embodiment, the padding 516 is because memory may be allocated in smaller blocks such as by a virtual machine (JVM). As will be described further in relation to FIG. 7, serialization may be performed to reduce memory consumption by merely storing the object data 514 in memory as a byte array without having to store the header 512 or the padding 516 that is otherwise excluded from the byte array.

Figure 6:
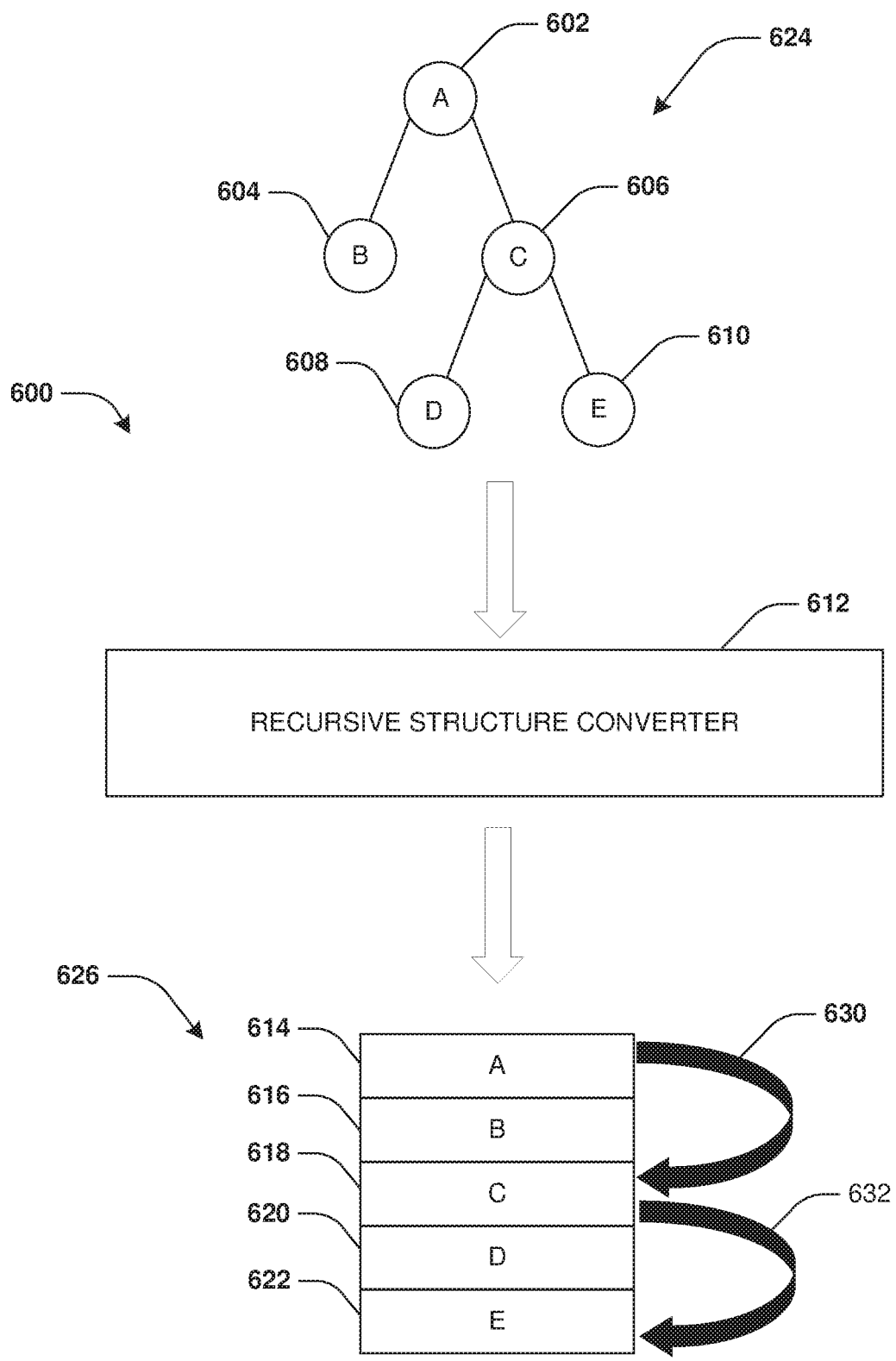
FIG. 6 is a component block diagram illustrating an example system for converting a data structure into an array, where a tree structure is converted into an array.

FIG. 6 illustrates an example of system 600 comprising a recursive structure converter 612 (e.g., hardware, software, or a combination thereof) for converting a tree structure 624 into an array 626. In an embodiment, the tree structure 624 comprises one or more nodes, such as a node (A) 602 that is a root node, a node (B) 604 that is a leaf node, a node (C) 606 that is a numerical (intermediary) node, a node (D) 608 that is a leaf node, and a node (E) 610 that is a leaf node. It may be appreciated that the tree structure 624 is illustrated with merely a few nodes for simplicity, but that the tree structure 624 could comprise any number of nodes, such as hundreds of thousands of nodes.

In an embodiment, the node (A) 602 may be a numerical (root) node that is a parent of the node (B) 604 and the node (C) 606. The node (B) 604 may be a leaf low child node of the node (A) 602 (e.g., a leaf node that is a child of the node (A) 602 and is a low node such as a node connected to the left of the node (A) 602). The node (C) 606 may be a numerical high child node of the node (A) 602 (e.g., a numerical node that is a child of the node (A) 602 and is a high node such as a node connected to the right of the node (A) 602). The node (C) 606 may be a numerical (intermediary) node that is a parent of the node (D) 608 and the node (E) 610. The node (D) 608 may be a leaf low child node of the node (C) 606 (e.g., a leaf node that is a child of the node (C) 606 and is a low node such as a node connected to the left of the node (C) 606). The node (E) 610 may be a leaf high child node of the node (C) 606 (e.g., a leaf node that is a child of the node (C) 606 and is a high node such as a node connected to the right of the node (C) 606).

The recursive structure converter 612 may initially process the node (A) 602 as a numerical node with the node (B) 604 as a leaf low child node and the node (C) 606 as a numerical high child node. The recursive structure converter 612 may insert the node (A) 602 into a first array element 614 of the array 626. The recursive structure converter 612 may insert the node (B) 604 into a second array element 616 that is next to (adjacent) the first array element 614 because the node (B) 604 is a leaf low child node of the node (A) 602. The recursive structure converter 612 may insert the node (C) 606 into a third array element 618 that is next to (adjacent) the second array element 616. The recursive structure converter 612 may set a high child reference index 630 to a value that is two greater than an index of the node (A) 602 because the node (C) 606 is a numerical high child node of the node (A) 602. That is, the high child reference index 630 points from the first array element 614 within which the node (A) 602 is stored to the third array element 618 within which the node (C) 606 is stored. The high child reference index 630 may comprise an index value in short integer format used to identify the third array element 618/the node (C) 606.

While processing the node (C) 606, the recursive structure converter 612 may determine that the node (D) 608 is a leaf low child node and that the node (E) 610 is a leaf high child of the node (C) 606 that is the parent of the node (D) 608 and the node (E) 610. The recursive structure converter 612 may insert the node (D) 608 into a fourth array element 620 that is next to (adjacent) the third array element 618, within which the node (C) as the parent of the node (D) 608 is stored, because the node (D) 608 is the leaf low child node of the node (C) 606. The recursive structure converter 612 may insert the node (E) 610 into a fifth array element 622 that is next to (adjacent) the fourth array element 620 because the node (E) 610 is the leaf high child node of the node (C) 606. The recursive structure converter 612 may set a high child reference index 632 to a value that is two greater than an index of the node (C) 606 because the node (E) 610 is the leaf high child node of the node (C) 606. That is, the high child reference index 632 points from the third array element 618 within which the node (C) 606 is stored to the fifth array element 622 within which the node (E) 610 is stored. The high child reference index 632 may comprise an index value in short integer format used to identify the fifth array element 622/the node (E) 610.

In this way, each node within the tree structure 624 is processed so that certain data, but not all data, from the tree structure 624 is inserted into the array 626. The array 626 is significantly more memory efficient (e.g., up to 90% more efficient) when loaded into memory for execution of a model associated with the tree structure 624 than the tree structure 624.

Figure 7:
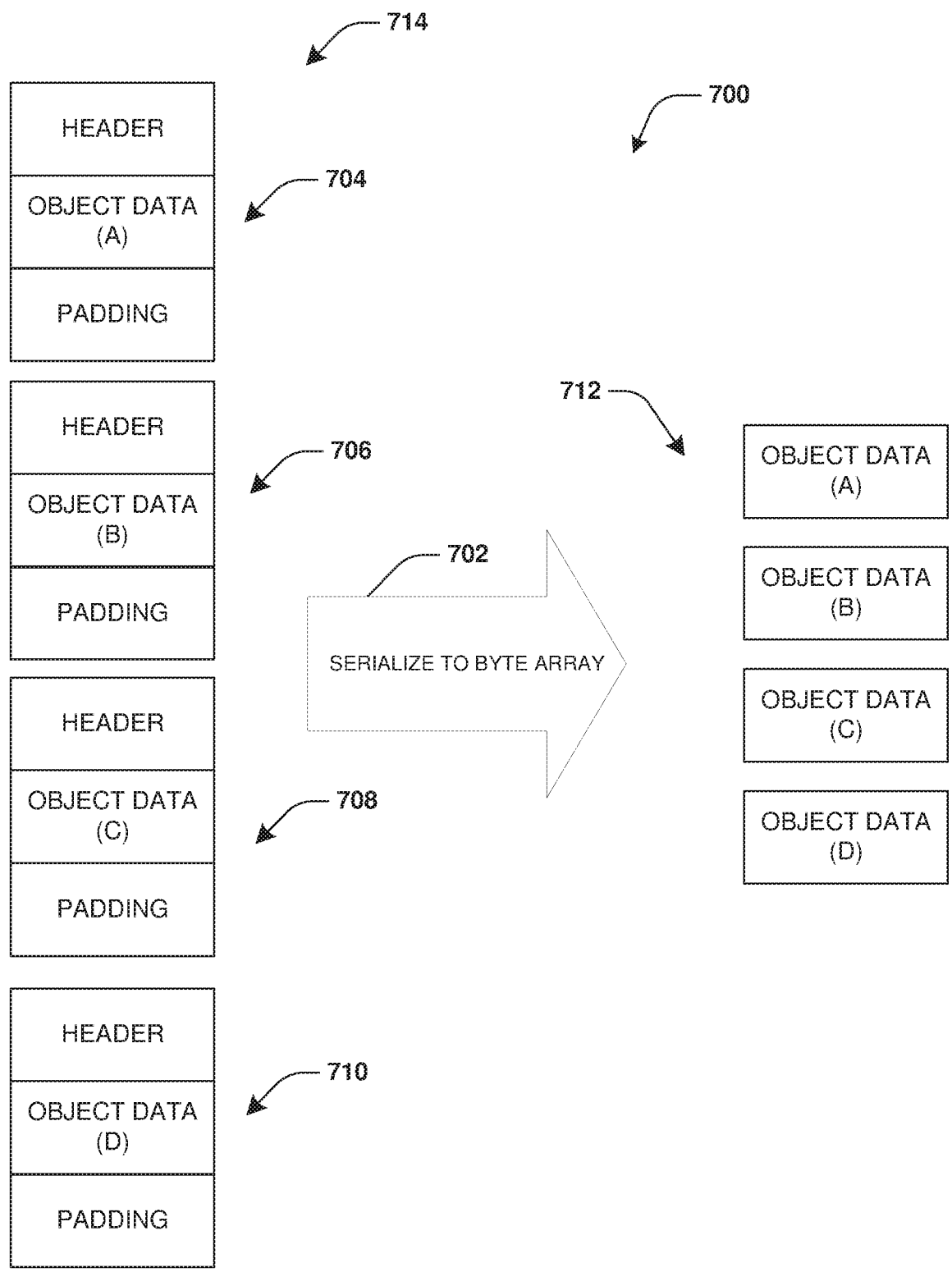
FIG. 7 is a component block diagram illustrating an example system for converting a data structure into an array, where a node array is serialized into a byte array.

FIG. 7 illustrates an example of system 700 for serializing 702 a node array 714 into a byte array 712. In an embodiment, the node array 714 comprises array elements within which nodes of a tree structure were inserted to convert the tree structure into the node array 714 for improved memory consumption. In order to further improve memory consumption, the node array 714 is serialized 702 into the byte array 712. In particular, the node array 714 comprises a first node structure 704 comprising a first header, object data (A) of a node (A) from the tree structure, and first padding. The node array 714 comprises a second node structure 706 comprising a second header, object data (B) of a node (B) from the tree structure, and second padding. It may be appreciated that the node array may comprise any number of node structures, such as a third node structure 708, a fourth node structure 710, and/or other node structures not illustrated. A header may correspond to an internal structure for memory management and garbage collection (e.g., a virtual machine (JVM) internal structure). The padding may correspond to additional storage padding because a virtual machine (JVM) allocated memory in relatively smaller blocks. The header and padding overhead of each node structure may consume a significant amount of memory.

Accordingly, the node array 714 is serialized 702 into the byte array 712. During serialization 702, the headers and paddings of the node array 714 are not stored into the byte array 712, and merely the object data of the node array 714 are stored into the byte array 712. This significantly reduces memory consumption when the byte array 712 is loaded into memory.

Figure 8:
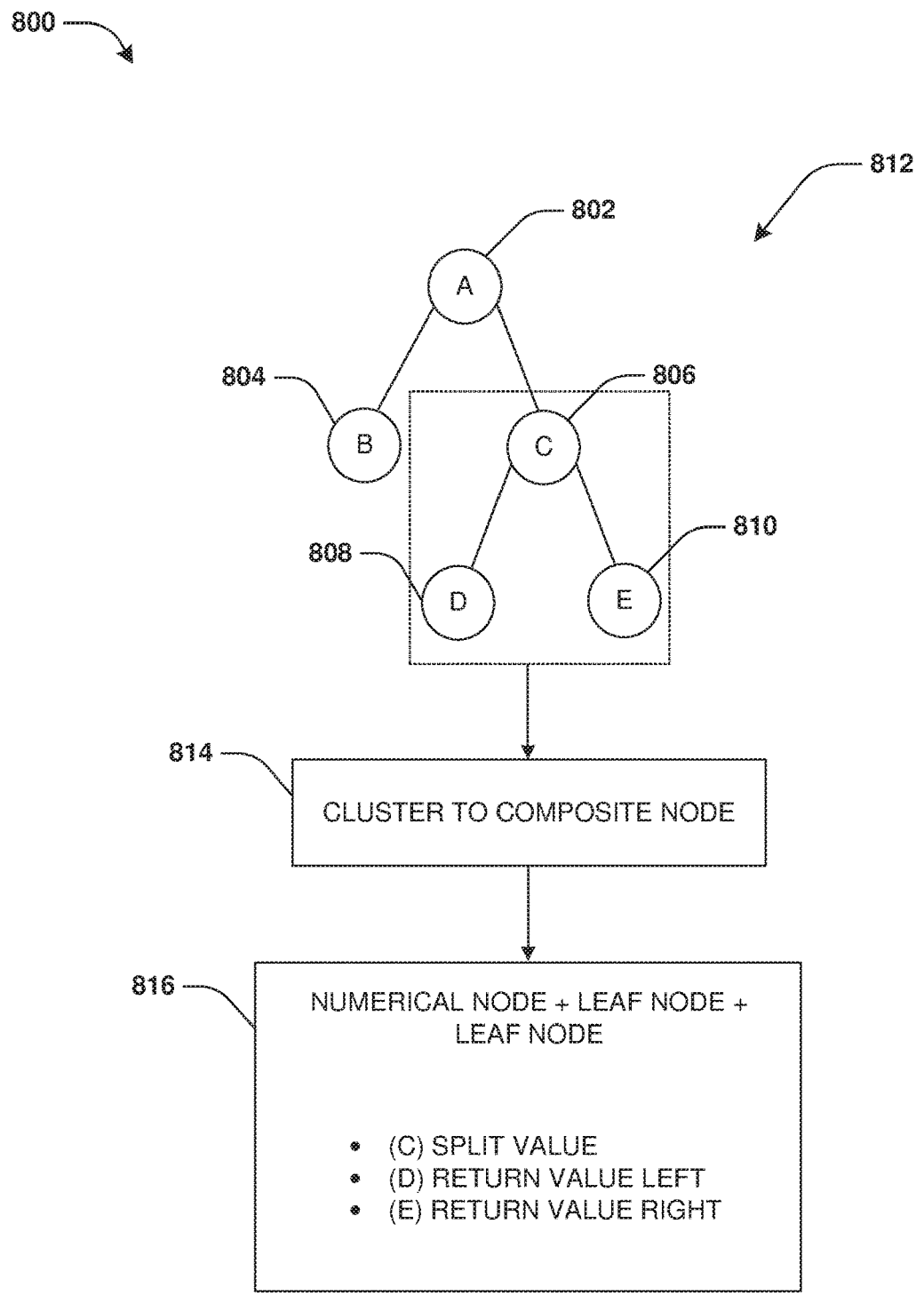
FIG. 8 is a component block diagram illustrating an example system for converting a data structure into an array, where a cluster of nodes are compacted into a composite node.

FIG. 8 illustrates an example of a system 800 for compacting nodes of a tree structure 812 into composite nodes (single block representations). The tree structure 812 comprises a node (A) 802 as a root node, a node (B) 804 as a leaf node, a node (C) 806 as a numerical node, node (D) 808 as a leaf node, and a node (E) 810 as a leaf node. The node (C) 806, the node (D) 808, the node (E) 810, and/or other nodes may be clustered 814 into a node cluster. In an embodiment, the node (C) 806, the node (D) 808, and the node (E) 810 are cluster together because the node (C) 806 is a parent of the node (D) 808 that is a leaf low child node and because the node (C) 806 is a parent of the node (E) 810 that is a leaf high child node. The node cluster is transformed into a single block representation 816 (a composite node) of the node (C) 806, the node (D) 808, and the node (E) 810. Bit level storage may be used to represent node types (e.g., the node (C) 806 as the numerical node, the node (D) 808 as the leaf node, and the node (E) 810 as the leaf node) of the node (C) 806, the node (D) 808, and the node (E) 810. The split value of the node (C) 806, a return value of the node (D) 808, and a return value of the node (E) 810 may be stored within the single block representation 816. The single block representation 816 (a composite node) consumes less memory than individually storing the node (C) 806, the node (D) 808, and the node (E) 810.

Figure 9:
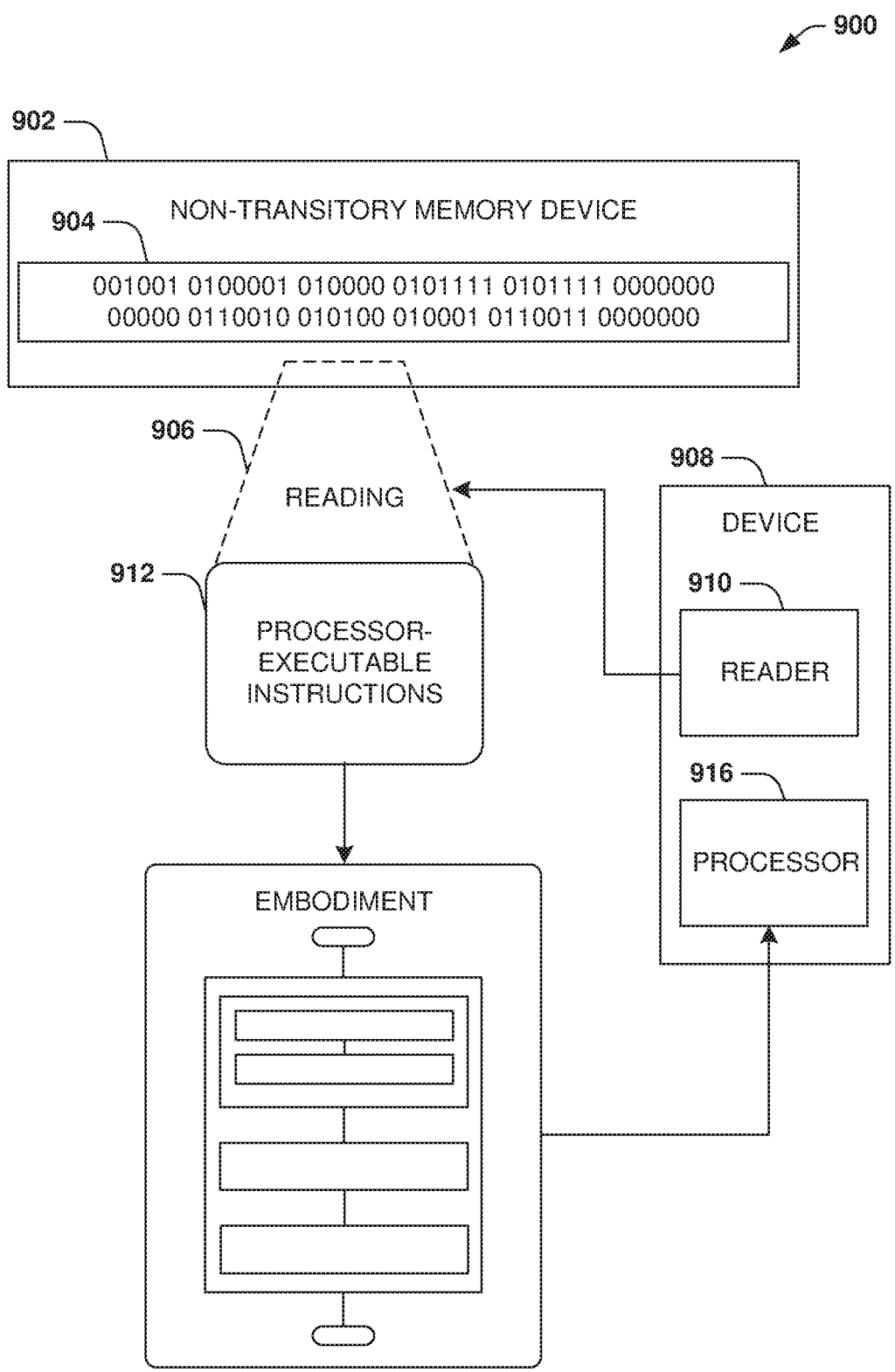
FIG. 9 is an illustration of a scenario featuring an example non-transitory machine readable medium in accordance with one or more of the provisions set forth herein.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein. The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed cause performance of operations, such as at least some of the example method 400 of FIG. 4, for example. In some embodiments, the processor-executable instructions 912 are configured to cause implementation of a system, such as at least some of the example system 600 of FIG. 6, at least some of the example system 700 of FIG. 7, and/or at least some of the example system 800 of FIG. 8, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   executing, on a processor of a computing device, instructions that cause the computing device to perform operations, the operations comprising:
      recursively processing nodes within a tree structure to convert the tree structure into an array, wherein for a node that is a parent of a low child node connected to the left of the node and a high child node connected to the right of the node:
         inserting the node of the tree structure into a first array element;
         inserting the low child node of the node into a second array element next to the first array element;
         inserting the high child node of the node into a third array element next to the second array element, and
         storing, in association with the node, a reference to the high child node that is within the third array element.

2. The method of claim 1, wherein the recursively processing nodes comprises:
   determining that a first low child node of a first node comprises a leaf low child node and that a first high child node of the first node comprises a numerical high child node;
   inserting the first node into a target array element;
   inserting the leaf low child node into a next array element;
   setting a high child reference index to a value that is two greater than an index of the first node; and
   inserting the numerical high child node into an array element subsequent the next array element.

3. The method of claim 1, wherein the recursively processing nodes comprises:
   determining that a first low child node of a first node comprises a leaf low child node and that a first high child node of the first node comprises a leaf high child node;
   inserting the first node into a target array element;
   inserting the leaf low child node into a next array element;
   setting a high child reference index to a value that is two greater than an index of the first node; and
   inserting the leaf high child node into an array element subsequent the next array element.

4. The method of claim 1, wherein the recursively processing nodes comprises:
   determining that a first low child node of a first node comprises a numerical low child node and that a first high child node of the first node comprises a numerical high child node;
   inserting the first node into a target array element;
   inserting the numerical low child node into a next array element;
   determining a populated size of the array;
   setting a high child reference index to a value corresponding to an end of the array identified using the populated size of the array; and
   recursively processing the numerical high child node.

5. The method of claim 1, wherein the recursively processing nodes comprises:
   determining that a first low child node of a first node comprises a numerical low child node and that a first high child node of the first node comprises a leaf high child node;

inserting the first node into a target array element;
inserting the numerical low child node into a next array element;
determining a populated size of the array;
set a high child reference index to a value corresponding to an end of the array identified using the populated size of the array; and
processing the leaf high child node.

6. The method of claim 1, wherein the tree structure represents a model used by machine learning functionality to output a prediction.

7. The method of claim 6, wherein the prediction corresponds to predicted user behavior.

8. The method of claim 1, comprising:
loading the array into memory for execution of a model represented by the tree structure.

9. The method of claim 1, wherein the array comprises a node array, and wherein the method comprises:
serializing the node array into a byte array comprising a type identifier byte indicating whether a node has a numerical node type or a leaf node type.

10. The method of claim 9, wherein the byte array comprises serialized internal data specifying split values of nodes.

11. The method of claim 9, wherein the byte array comprises serialized internal data specifying a feature index.

12. The method of claim 9, wherein the byte array comprises serialized internal data specifying an offset reference to the high child node having a numerical node type.

13. The method of claim 9, wherein the byte array comprises serialized internal data specifying a double value for a high child node having a leaf node type.

14. A computing device comprising:
a processor; and
memory comprising processor-executable instructions that when executed by the processor cause performance of operations, the operations comprising:
recursively processing nodes of a tree structure to generate an array, wherein for a node that is a parent of a low child node connected to the left of the node and a high child node connected to the right of the node:
inserting the node of the tree structure into a first array element;
inserting the low child node of the node into a next array element;
inserting the high child node of the node into an array element next to the next array element, and
storing, in association with the node, a reference to the high child node that is within the array element next to the next array element.

15. The computing device of claim 14, wherein the reference comprises an index value in short integer format.

16. The computing device of claim 14, wherein the operations comprise:
generating a lookup table comprising values occurring within models greater than a frequency threshold.

17. The computing device of claim 16, wherein the operations comprise:
utilizing the lookup table to compress the array.

18. A non-transitory machine readable medium having stored thereon processor-executable instructions that when executed cause performance of operations, the operations comprising:
recursively processing nodes of a tree structure to generate an array, wherein for a node that is a parent of a low child node connected to the left of the node and a high child node connected to the right of the node:
inserting the node of the tree structure into a first array element;
inserting the low child node of the node into a second array element;
inserting the high child node of the node into a third array element, and
storing, in association with the node, a reference to the high child node that is within the third array element.

19. The non-transitory machine readable medium of claim 18, wherein the operations comprise:
clustering one or more nodes of the tree structure into a cluster for storage within the array as a single block representing the one or more nodes.

20. The non-transitory machine readable medium of claim 18, wherein the operations comprise:
utilizing bit level storage to represent node types and compression flags.

* * * * *